United States Patent [19]
Washington et al.

[11] Patent Number: 5,860,141
[45] Date of Patent: Jan. 12, 1999

[54] METHOD AND APPARATUS FOR ENABLING PHYSICAL MEMORY LARGER THAN CORRESPONDING VIRTUAL MEMORY

[75] Inventors: Peter Washington, Little Mountain; John H. Waters, Columbia; Richard R. Barton; Vernon K. Boland, both of Lexington, all of S.C.

[73] Assignee: NCR Corporation, Dayton, Ohio

[21] Appl. No.: 763,918

[22] Filed: Dec. 11, 1996

[51] Int. Cl.⁶ ...................................................... G06F 12/00
[52] U.S. Cl. .................. 711/202; 711/1; 711/2; 711/3; 711/202; 711/206; 711/207; 711/208; 711/203; 395/182.18; 395/710
[58] Field of Search ................................ 711/1, 2, 3, 202, 711/203, 206, 207, 208; 395/182.18, 710

[56] References Cited

U.S. PATENT DOCUMENTS

| | | | |
|---|---|---|---|
| 5,412,801 | 5/1995 | De Remer et al. ................ | 395/182.18 |
| 5,418,965 | 5/1995 | Mahar ...................................... | 395/700 |
| 5,420,993 | 5/1995 | Smith et al. .............................. | 711/206 |
| 5,426,747 | 6/1995 | Weinreb et al. ......................... | 395/400 |
| 5,455,942 | 10/1995 | Mohan et al. ........................... | 395/600 |
| 5,465,352 | 11/1995 | Nakazawa et al. ..................... | 395/600 |
| 5,581,722 | 12/1996 | Welland ................................... | 711/207 |
| 5,699,551 | 12/1997 | Taylor et al. ............................ | 711/207 |
| 5,749,084 | 5/1998 | Huck et al. .................................. | 711/1 |

*Primary Examiner*—Tod R. Swann
*Assistant Examiner*—Nasser Moazzami
*Attorney, Agent, or Firm*—Steven J. Adamson

[57] ABSTRACT

A method and apparatus for enabling a physical memory larger than a corresponding virtual memory. An apparatus is disclosed that includes a processor having an address word of a predefined length, a main memory having a size larger than the addressable range of the predefined address word, and virtual memory logic for configuring the processor virtual memory to contain a subset of the main memory as resident memory and pointers to the remainder of main memory. Analogous method steps are disclosed as is dividing main memory into a plurality of buffer uniquely identifiable within the address range of the predefined address word.

17 Claims, 2 Drawing Sheets

| | 0 | 1 | ... | M-1 | M | M+1 | ... | N-1 |
|---|---|---|---|---|---|---|---|---|
| V ADDR | 0000H | 1000H | ... | M-1*<br>1000H | NULL | NULL | ... | NULL |
| REF CNT | 0 | 0 | ... | 0 | 0 | 0 | ... | 0 |
| INDEX | -1 | -1 | ... | -1 | 0 | 1 | ... | N-M-1 |

| | 0 | 1 | ... | M-1 | M | M+1 | ... | N-1 |
|---|---|---|---|---|---|---|---|---|
| V ADDR | 0000H | NULL | ... | M-1*<br>1000H | 1000H | NULL | ... | NULL |
| REF CNT | 2 | 0 | ... | 0 | 1 | 0 | ... | 0 |
| INDEX | -1 | 0 | ... | -1 | -1 | 1 | ... | N-M-1 |

METHOD AND APPARATUS FOR ENABLING PHYSICAL MEMORY LARGER THAN CORRESPONDING VIRTUAL MEMORY

FIELD OF THE INVENTION

The present invention relates to the relationship between virtual memory address space and corresponding physical memory space. More specifically, the present invention relates to enabling a physical memory that is larger than, yet fully addressable by, a corresponding virtual memory.

BACKGROUND OF THE INVENTION

Conventional processor environments often include external memory, usually magnetic or optical disk, and faster access local memory, usually RAM. The local memory may be further divided into quicker access SRAM, usually embodied in a cache memory, and main memory, often comprising DRAM. Application software running on such a processor is provided virtual addresses by the operating system to access main memory. The memory management unit (MMU) of the operating system, usually through a paging system, maps virtual memory locations to main memory locations by constructing a page table and page descriptors as is known in the art.

With improvements in processor performance specifications, a need has developed to increase the amount of main memory available to a processor. Typically, a memory increase is achieved by designing a new processor that has a larger virtual memory address space by virtue of a larger virtual address word. For example, the address word length can be expanded from 8 to 16 bits, 16 to 32 bits, or 32 to 64 bits, etc. A disadvantage, however, of pursuing this approach is that designing a new processor is expensive and requires substantial development time.

The amount of available virtual memory space is further constrained by the complexity of new software programs. An example of this constraint involves Microsoft's Windows NT platform and the Intel line of microprocessors including the 486 and Pentium models. These Intel microprocessors have a 32 bit address word which provides a virtual memory address range of up to approximately 4 GB (4,294,967,296 bytes). Windows NT requires 2 GB of this virtual memory address space, leaving only 2 GB for application software. This limitation on available fast access memory, increases the frequency of slower remote memory accesses, thereby degrading overall system performance.

SUMMARY OF THE INVENTION

Accordingly, it is an object of the present invention to provide a method and apparatus for providing a physical memory space that is larger than, yet fully addressable by, a corresponding virtual memory address space.

It is another object of the present invention to provide such a method and apparatus that is capable of supporting shared memory.

These and related objects of the present invention are achieved by use of the method and apparatus for enabling physical memory larger than corresponding virtual memory disclosed herein.

One method embodiment of the present invention includes the steps of providing a processor having an address word length of a predefined size; providing a main memory having a size larger than the addressable range of the predefined address word; dividing the main memory into a plurality of buffers, each uniquely identifiable within the addressable range of the predefined address word; creating a unique identifier for a number of the buffers which when multiplied by buffer size equals a memory size larger than the addressable range of the predefined address word; and providing the unique identifiers in the virtual address space of a process running in the processor. This method may also include the steps of defining a subset of the buffers that are mapped to the virtual address space of a process running in the processor; defining a subset of the buffers that are not mapped to the virtual address space of a process running in the processor; and creating a list of mapped buffers that are least recently used. When a not mapped buffer is requested, it is switched with a mapped buffer in the list of least recently used mapped buffers. Mapped buffers may be further defined as Active and Inactive, the Inactive buffer being placed on the list of least recently used buffers. The method may also include the step of making a call to a library function which operates at an interface between an application and the operating system in the processor.

One apparatus embodiment of the present invention includes a processor having an address word of a predefined length; a fast access main memory having a size larger than the addressable range of the predefined address word; and virtual memory logic for configuring a virtual memory of the processor to have an address range addressable by the predefined address word and to contain a subset of the main memory as resident memory and pointers to the remainder of the main memory. This apparatus also comprises means for switching a portion of the resident memory with a requested portion of the remaining memory. This apparatus also includes means for generating a list of least recently used resident memory for switching and means for creating structures that include a measure and a flag field for each portion main memory.

Another apparatus embodiment of the present invention includes a processor having an address word of a predefined length; a fast access main memory having a size larger than the addressable range of the predefined address word; and means for dividing the main memory into a plurality of buffers, uniquely identifiable within the address range of the predefined address word.

The attainment of the foregoing and related advantages and features of the invention should be more readily apparent to those skilled in the art, after review of the following more detailed description of the invention taken together with the drawings.

DETAILED DESCRIPTION

The present invention is applicable to processors having address words of any length, including 8, 16, 32 and 64 bits, etc. For purposes of teaching the present invention, an embodiment having a 32 bit address word is presented below. Modifications of this embodiment to support address words of other lengths would be apparent to one skilled in the art given the teachings herein and are included within the present invention. Though the present invention is well suited for use in conventional computers, it is applicable to any processor regardless of the machine within which it is used.

The invention will be described in the context of an operating system and application software. As taught below, the present invention is well suited for use with application software such as that used in the database management systems (DBMS) of Oracle or Informix, though it is applicable to all application software. Modification of the system calls or other aspects of the below discussed embodiment to support other application software or operating systems would be apparent to one skilled in the art given the teachings herein and are intended to be within the present invention. The present invention may also be practiced in operating systems that support or do not support shared memory. The embodiment discussed below supports shared memory and preferably utilizes Unix System 5, Release 4 for shared memory (SVR4). Non shared memory operating systems are included within the present invention and modifications to support non shared memory configurations would be apparent to one skilled in the art given the teachings herein.

The system of the present invention in which a main memory larger than a corresponding virtual memory address space is allocated to a processor is referred to herein as the very large memory system (VLMS) and the memory itself is referred to as the very large memory (VLM).

Figure 1:
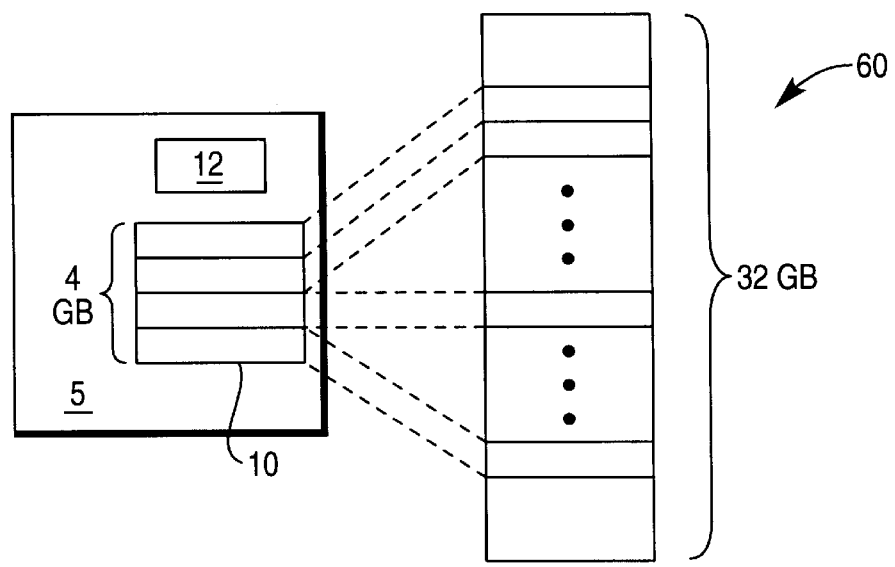
FIG. 1 a diagram illustrating a relationship between virtual memory and physical memory in accordance with the present invention.

Referring to FIG. 1, a diagram illustrating the relationship between virtual memory 10 and physical memory 60 in accordance with the present invention is shown. If the address word of processor 5 provides a virtual memory of 4 GB (i.e., 32 bit address word) and 1 GB is used for memory management and control software, then 3 GB of virtual memory are available to application software. If the physical size of main memory is 32 GB, then 3 GB of this physical memory may be mapped to a processor's virtual memory space and 29 GB are not mapped. To permit the unique addressing of the entire main memory (the 3 GB of mapped memory and the 29 GB of unmapped memory), main memory is preferably divided into a number of equal sized buffers that can be individually addressed within the available virtual memory address space. For example, if the main memory is 32GB and is divided into blocks of 4kb, then 8M unique identifiers are needed and this is well within a 32 bit address word. The remaining virtual memory space or 4 Gb−8Mb=3.992 Gb is available for physical memory mapping.

Block 12 represent logic, including hardware and software, within the processor for carrying out the present invention.

Figure 2:
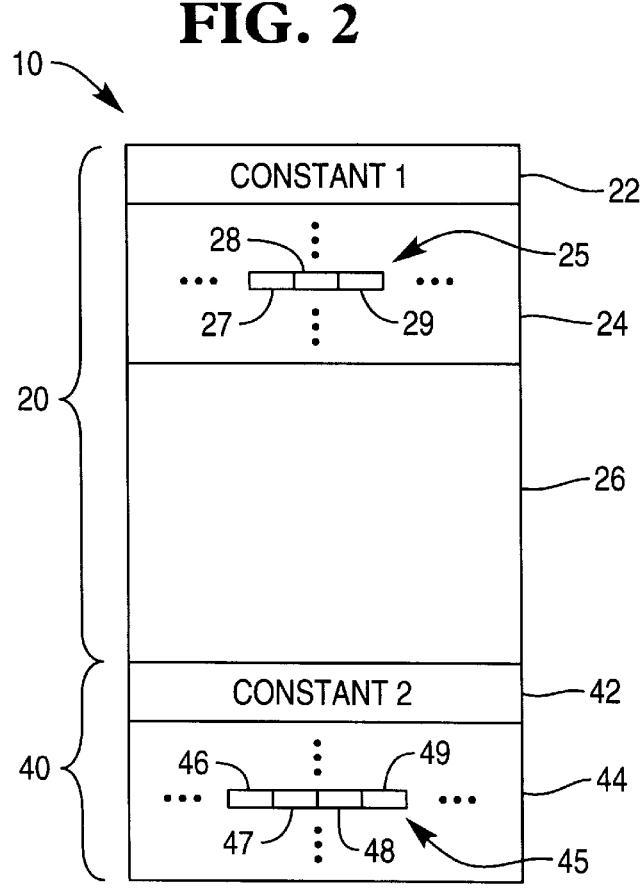
FIG. 2 is a diagram of the layout of virtual memory in accordance with the present invention FIG. 3. is a diagram of the allocation of n buffers as they are initially allocated in accordance with the present invention.

Referring to FIG. 2, a diagram of the layout of virtual memory 10 in accordance with the present invention is shown. Virtual memory 10 includes file system memory 20 and shared memory 40. File system memory 20 includes a constant 22, application memory 24 for uniquely identifying each buffer in main memory and resident buffers 26 which are those buffers in main memory that are mapped to a virtual memory address. Shared memory 40 includes a constant 42 and a library memory 44 which contains information for linking to each buffer.

Figures 3, 4, 5:
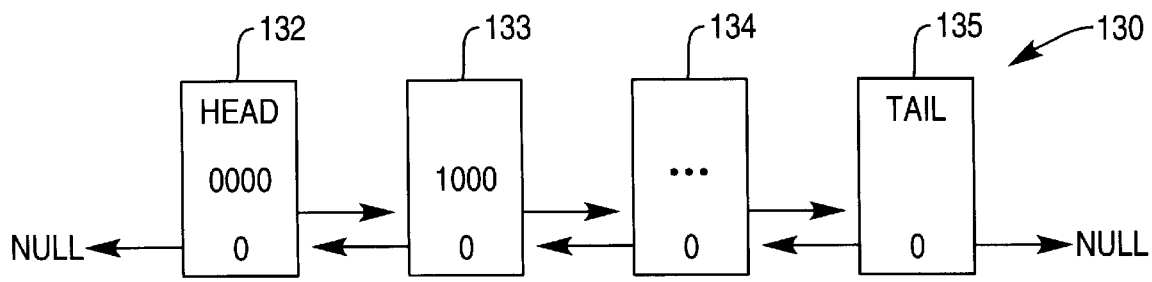
FIG. 4 is a diagram of a Least-Recently-Used (LRU) queue in accordance with the present invention.
FIG. 5 is a diagram of the allocation of the n buffers of FIG. 3 in which Buffer 1 has been switched with Buffer m in accordance with the present invention.

Application memory 24 includes a data buffer header 25 for each buffer allocated in physical memory. A data buffer header is defined by the application software and each header includes a pointer 27 to one of the data buffers and fields 28,29 for linking to the other data buffer headers. Library memory 44 includes a structure 45 for each buffer allocated in physical memory. This structure is referred to herein as a library structure 45 or "libstruct". The libstruct is used by the library level code (described herein) which functions as an interface between the application software and the operating system. A libstruct preferably includes an access count (a measure field) 46, an index (a flag field) 47, fields 48 for linking to other structures and a corresponding virtual address 49. Libstructs are shown in FIGS. 3–5 below without the linking fields. Constant 22 contains information specific to the application software such as instructional and configuration variables and buffer locking parameters. Constant 42 contains similar information for the operating system. Constants 22,42, application memory 24 and library memory 44 constitute memory management overhead, while resident buffers 26 constitutes the available virtual memory address space.

The size of each data buffer header (termed "headerSize" below) may be defined in terms of the extended memory size (extended memory is that memory within main memory that is not presently linked to a virtual address location, i.e., main memory-resident buffers=extended memory). The length of each data buffer header or the headerSize can be expressed in terms of the extended memory size as follows.

$$VM=(headerSize+libstructSize)*numBuffers)+\\(residentBuffers*bufferSize)+C$$

where

C=Constant 1+Constant 2.

Solving for the headerSize provides:

VM−(residentBuffers*bufferSize)−C=(headerSize+libstructSize)*numBuffers;

(VM−(residentBuffers*bufferSize)−C)/numBuffers)= headerSize+libstructSize; and headerSize=((VM−(residentBuffers*bufferSize)−C)/numBuffers)−libstructSize The number of buffers can be defined as:

numBuffers=residentBuffers+extendedBuffers; and numBuffers=residentBuffers+(extendedMemorySize/bufferSize).

Thus, the headerSize defined in terms of extended memory size yields:

headerSize=((VM−(residentBuffers*bufferSize)−C)/(residentBuffers+(extendedMemory/bufferSize)))−libstructSize. To solve for the maximum headerSize, the following assumptions are made: minimum number of residentBuffers is 1024, bufferSize is 4096, the constant C is negligible and can be ignored, maximum virtual memory (VM) available is 2 GB, maximum system memory for extendedBuffers is 30 GB, and libstructSize is 32 bytes. Substituting these values into the equation above, provides:

headerSize=((2GB−(1024*4096))/(1024 +(30 GB/4096)))−32, or headerSize=240 bytes.

If a larger structure size is required, this can be achieved, for example, by increasing buffer size from 4K to 8K or by decreasing the size of main memory from 32K to 24K, 20K or 16K.

Having introduced the general layout and operation of the VLMS, the manner in which the above features are achieved is now discussed in more detail. The file system approach by which the application software views virtual memory is discussed first. This is followed by discussions of buffer allocation, kernel level considerations and library level system calls.

File System

Virtual memory is preferably implemented within the operating system kernel as a file in a pseudo file system in which there is a one to one correspondence between buffers and conventional memory pages (though it should be recognized that other buffer sizes are contemplated, e.g., 2× page size, 0.5× page size, etc.). The file system fixes the order of pages in the same manner as in disk storage, but is wholly resident in main memory 60. The file system is preferably "flat", meaning it does not support directories and all files reside immediately under a common mount point. In a computing apparatus having multiple processor-main memory pairs, only one copy of the file system exists per processor-memory pair. The file system is preferably mounted over a well-known directory.

VLMS files are manipulated in a manner analogous to that of files in conventional file systems. Files are created by the Unix level 2 (or kernel level) calls of open or creat and removed by unlink. Identification of the VLMS file is by file name. Therefore, sharing of main memory 60 is accomplished by all applications opening the same VLMS file. Permissions to the VLMS file are guaranteed using conventional Unix file permissions and ownership conventions. Once resources are allocated to the file they are not released until the file is removed.

The following is the expected sequence of events an application will perform to make use of the VLMS pseudo file system. The application opens a file. If the file exists, the successful open provides the application access to the resources of that file. If the file does not exist, one is created with no resources allocated to it. It is a zero-length file.

The first mmap (a Unix kernel level call) to a VLM file allocates the application visible resources (e.g., for a database application this is the headers and resident buffers). The application includes the length of the portion of its address space to be occupied by the memory object in the mmap call. The file system uses that length to allocate all the pages and map them into the application's address space. Subsequent mmap calls to this file must be for the same size and at the same virtual address that was established by the initial mmap call. At this point, the application is free to make use of the mmaped portion of its address space.

To allocate resources for the external buffers, the application makes a file system ioctl call, which is a general purpose kernel level mechanism for communicating with a driver. An argument of this ioctl call specifies the number of pages to be allocated in the extended memory. A successful return means that all of the given number of pages have been allocated.

At any time the application may invoke a sysvendor system call to swap physical pages between the mmaped portion of the address space and the extended buffers. To achieve a swap, the application provides a data buffer header to the library which translates the header to an index which is passed to the kernel. The kernel determines the physical address of the page and maps it to a virtual address provided by the library from the LRU. The virtual address is returned to the application. The sysvendor call achieves this function and is termed the "sysvendor map call" for purposes of the discussion herein. The sysvendor map call takes at least the following as arguments: a virtual address within the mmaped portion of the address space at which to swap the physical memory, an unsigned long representing the index (the library level indication of the ordering of pages that corresponds to the application level data buffer header) into the pages of the extended buffers, and a unsigned long representing the number of contiguous pages whose physical mapping to swap. A successful return indicates that the given number of physical pages mapped by the given virtual address are now part of the extended memory at the given index and the given number of physical pages that previously resided in the extended memory at the given index are now mapped at the given virtual address.

Buffer Allocation

A plurality of library level calls are defined to permit an application to interface with the operating system. They include VlmGet which obtains a VLM identifier (which identifies a block of allocated physical memory), VlmMap which maps data buffer headers and resident buffers into a process' address space, VlmUnmap which unmaps these headers and buffers from the process' address space, VlmDestroy which releases the allocated VLM and returns it to the operating system for use elsewhere, VlmMapPage which ensures that the buffer associated with the database structure has a valid virtual address, VlmUnmapPage which allows a virtual address of a buffer to be reused and VlmSetParameter and VlmGetParameter which respectively set or get a parameter in the VLM that is useful in porting from a conventional shared memory interface to the VLM interface described herein.

The VlmGet function is used to create a file in the Vlm file system, the memory used for headers and resident buffers, the extended buffers, and the shared memory used internally to manage the VLM. If the VLM already exists, the VlmGet function may be used to get the identifier associated with the VLM instance (in a shared memory implementation).

Referring to FIG. 3, a diagram 100 of the allocation of n buffers as they are initially allocated in accordance with the present invention is shown. A virtual memory address, a reference count and an index are provided for each buffer. The first m buffer (0,1, . . . ,m−1) are the resident buffers which have valid virtual addresses. The remaining buffers are the extended buffers (m,m+1, . . . ,n−1) which do not have virtual addresses (i.e., they have a NULL virtual address value). The initial reference counts are zero for all buffers and the indexes are−1 for resident buffers and 0,1, . . . ,n− m−1 for extended buffers. The reference count indicates whether a buffer is currently being accessed, a value greater than zero specifying an access. The index indicates whether a buffer has a valid virtual memory address (flag set at−1) and for those buffers that do not, the index provides both a count of the number of allocated extended buffers and a unique value (number) for each extended buffer.

If a resident buffer's reference count is zero, it is placed on a Least-Recently-Used (LRU) queue (FIG. 4 below) and is a candidate to be switched, i.e., its virtual address may be reused to map to an extended buffer. The LRU queue is utilized to prevent the virtual addresses of the more frequently accessed buffers from being reused.

Referring to FIG. 4, a diagram 130 of a Least-Recently-Used queue in accordance with the present invention is shown. In the initial state of the LRU, as illustrated in diagram 130, all resident buffers (0,1, . . . ,m−1) have a reference count of zero and are within the LRU queue. Block 132 represents the head of the queue which contains the reference count for the buffer at 0000H, the first of the m resident buffers. Block 132 points to block 133 and to null (as the head, block 132 has no predecessor). Block 133 contains the reference count for Buffer 1 and points to block 132 and block 134. Block 134 is representative of the intervening buffers and points to block 133 and block 135 (the tail of the queue).

The LRU queue is preferably a doubly linked list implemented with pointers in the kernel and four bytes within the virtual memory space that point to the start of the queue. It should be recognized that when a memory access within a resident buffer on the LRU is made, the reference count for that buffer is incremented and the pointers associated with the position of that buffer within the LRU are updated to remove that buffer from the LRU.

The reference count of a buffer and whether that buffer has a valid virtual address determines which of three possible states a buffer is in. These states are:

Active—the buffer has a valid virtual address and its reference count is greater than or equal to one;

Inactive—the buffer has a valid virtual address and its reference count is zero (all inactive buffers are on the LRU queue); or Stored—the buffer does not have a valid virtual address and is part of the extended buffers (the buffer's index indicates the location at which it is stored). Before accessing a buffer, the VlmMapPage is called by the application to ensure that the buffer is associated with a valid virtual address. If the buffer is in the active state, VlmMapPage increments the buffer's reference count (i.e., a buffer's reference count is incremented each time a process accesses the buffer and is not decremented until the buffer is released). If the buffer is in the inactive state, VlmMapPage removes the buffer from the LRU queue and increment its reference count.

With respect to buffers in the stored state, before a stored buffer can be used, it must be "switched" with the inactive buffer at the head of the LRU queue. After the buffers are switched, the newly requested buffer is associated with the virtual address that belonged to the LRU buffer previously at the head and its reference count is incremented to one. The buffer previously at the head is now stored as an extended buffer.

Referring to FIG. 5, a diagram of the allocation of the n buffers of FIG. 3 in which Buffer 1 has been switched with Buffer m in accordance with the present invention is shown. This switch is indicated in that virtual memory addresses for Buffers 1 and m have been switched and the indexes for Buffers 1 and m are 0 and −1, respectively. It should also be recognized that the reference count of Buffer 0 is 2, indicating that two processes are accessing Buffer 0 (e.g., in a shared memory scenario).

When a buffer is no longer active, VlmUnmapPage is called to decrement the buffer's reference count. If the reference count is zero, the buffer is put on the LRU queue where its virtual address may be reused to map in an extended buffer. Once VlmUnmapPage is called, a corresponding buffer cannot be referenced without first calling VlmMapPage.

Kernal View

The following teachings are directed towards operating system enhancement for practicing the present invention.

The VLM pseudo file system is implemented using the conventional virtual file system (VFS) interfaces. There is also a conventional segment driver that manages the address space and memory associated with the mmaped resident buffers and extended buffers.

The file system allocates VLM nodes and adds them to a linked list as each file is created. These nodes, termed nnodes, are essentially modified inodes in which the features for directory hierarchy have been removed (because the file system is flat) and field have been added to implement VLM in system memory, e.g., as opposed to disk memory. The nnodes contain a field that describes where memory begins and pointers to cache, number of pages and number of reserve pages. The nnode number is taken from a variable that is incremented as each VLM file is created. File create, access and modify times are updated appropriately as is known in the art. File size is a representation of the number of pages allocated that can be mmaped (resident buffers).

The file system communicates with the segment driver that manages all of the pages associated with the VLM file system. The driver will deny any request for pages from the Unix pageout daemon or swapper which effectively "locks" the pages in resident or extended memory. Since no inode is associated with the pages, the fsflush daemon ignores them and since no swap space is allocated to these pages, there are no anon structures associated with the segment driver.

With respect to the extended buffer pages, they are allocated by an ioctl call to the VLM file system. The VLM file system allocates pages of 4 Kb along with a control structure that will be used to manage the extended buffers. The control structure is preferably an array of pointers (an array of libstructs), consisting of a pointer to each page structure that is allocated for the buffers. To manage 4 Mb of extended buffers with a buffer size of 4 Kb and a structure size of 4 bytes, 4 bytes×1000 buffers or 4 Kb of memory will be required for the structures. The address of the control structure and the number of 4K pages that make up the extended buffers are stored in the nnode for the VLM file. An error is returned if the extended buffer memory of the ioctl call has already been allocated. With respect to deallocation of buffers, freeing the memory associated with resident or extended buffers can be done in one of two ways. When the VLM file is removed, both the resident buffer and the extended buffer memory are deallocated, along with all control structures associated with the file, including the nnode. If the given file is open at the time of the unlink request, the file is removed from the directory, however, all of the buffers associated with that file will be available to all processes that currently have the file mmapped. At the time of the last close of the file, all memory associated with the file is deallocated.

Two ioctl calls are used to respectively remove either the resident buffer memory or the extended buffer memory. The extended buffer memory may be released at any time, however, the resident buffer memory will not be released until all processes that mmaped the buffers have successfully completed an unmap or the process has exited. There is no option as to how much memory the user can deallocate. By definition, a user will release all of the memory associated with the buffers.

With respect to mapping the resident buffers, in SVR4 the segment driver is responsible for managing the portion of the address space that has been mmaped. The VLM segment driver allocates the resident buffers at the time of the mmap call. The buffers are then mapped into the user's virtual address space, based on the mmap request. In order to ensure adequate performance, the VLM segment driver implements shared page lo tables (via the hardware address translation layer) for its virtual mappings (for a shared memory implementation). When mmaping buffers in the VLM file system, the virtual address requested by the mmap call preferably resides on a page boundary and all subsequent mmap calls contain the same virtual address, length and protection as specified in the initial mmap request.

Description of Library Level Calls

The library level calls described herein provide translation between the application software and operating system. They are implemented using conventional programming techniques.

VlmGet returns the VLM identifier associated with the key (an abstraction used in system V for interprocess communication). If the key is not associated with an identifier and flag field values are true, then the following VLM components are created: the shared memory segment that is used internally by the VLM library to manage the buffers, the file associated with VLM, size bytes of memory requested by the application (the size includes the memory to manage the headers, and resident buffers) and the extended buffers.

VlmMap maps the memory allocated for the database structures and resident buffers by the VlmGet call at the specified address.

VlmUnmap is used to unmap the memory allocated for the database structures and resident buffers from the process' address space.

VlmDestroy removes the VLM file associated with the VLM and the shared memory segment used internally to manage the VLM. The headers, the resident buffers, and the extended buffers are destroyed as a result of removing the VLM file.

With respect to VlmMapPage, the VlmGet routine is called to allocate n buffers each of which will be associated with a library level index (0,1,2, . . . ,n−1). As many of these buffers (0,1,2, . . . ,m−1) as possible are allocated as resident buffers so that they can later be mapped into the process' address space using the VlmMap routine. The additional requested buffers (m,m+1,m+2, . . . ,n−1) are allocated as extended buffers in the VLM. At any given time, there will be m resident buffers (initially the first m buffers) with a valid virtual address. Before accessing any of the database buffers, VlmMapPage must be called to ensure that the buffer is associated with a valid virtual address. If the VlmPage is called with a header that corresponds to a buffer that does not have a valid virtual address, then the buffer is given the least recently used (LRU) virtual address.

VlmUnmapPage is called with a pointer to a header that corresponds to a buffer. When VlmUnmapPage is called, the reference count associated with the buffer is decremented. If the reference count becomes zero, the page may be reused by VlmMapPage to map in another buffer. Once VlmUnmapPage is called by a process, the database buffer associated with the database structure is not accessed again without first calling VlmMapPage.

With respect to VlmSetParameter and VlmGetParameter, VLM is designed as a replacement for a conventional shared memory interface. However, additional information is required by some of the VLM library functions. This additional information may not be easily accessible when it is needed by the application memory management code without changes. To reduce the porting effort, the VlmSetParameter may be used to store information that may be needed by the application memory management code or the VLM library. VlmGetParameter is used to retrieve information based on the stored values.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A method of allocating memory, comprising the steps of:

providing a processor having an address word length of a predefined size;

providing a main memory having a size larger than the addressable range of said predefined address word for storing data for use by a process running in said processor;

dividing said main memory into a plurality of buffers, each uniquely identifiable within the addressable range of said predefined address word;

creating a unique identifier for a number of said buffers which when multiplied by buffer size equals a memory size larger than the addressable range of said predefined address word; and providing said unique identifiers in the virtual address space of a process running in said processor.

2. The method of claim 1, further comprising the steps of:

creating a unique structure including a measure field and a flag field for each buffer for which a unique identifier was created; and providing said unique structures in the virtual address space of a process running in said processor.

3. The method of claim 1, further comprising the steps of:

defining a subset of said buffers that are mapped to the virtual address space of a process running in said processor; and defining a subset of said buffers that are not mapped to the virtual address space of a process running in said processor.

4. The method of claim 3, further comprising the step of creating a list of mapped buffers that are least recently used.

5. The method of claim 4, further comprising the step of switching a requested not mapped buffer with a mapped buffer in said list of least recently used mapped buffers such that after switching the previously not mapped buffer is now mapped and the previously mapped buffer is now not mapped.

6. The method of claim 4, wherein said defining step comprises the steps of:

further defining said mapped buffers to comprise Active and Inactive buffers, said Active buffers defined as those buffers that are in use by a process in said processor and said Inactive buffers defined as those buffers that are not in use by a process in said processor; and placing Inactive buffers in said least recently used list.

7. The method of claim 1, wherein said step of creating a unique identifier includes the step of making a call to a library function which operates at an interface between an application and the operating system in said processor.

8. An apparatus for processing electronic data, comprising:

a processor having an address word of a predefined length;

a main memory having a size larger than the addressable range of said predefined address word; and virtual memory logic for configuring a virtual memory of said processor to have an address range addressable by said predefined address word and to contain a subset of said main memory as resident memory and pointers to the remainder of said main memory.

9. The apparatus of claim 8, further comprising means for switching a portion of said resident memory with a portion of the remaining memory when that portion of the remaining memory is requested by said processor.

10. The apparatus of claim 8, further comprising:

means for designating a portion of the resident memory that is least recently used; and means for switching a requested portion of the remaining memory with a least recently used portion of the resident memory.

11. The apparatus of claim 8, wherein said main memory is divided into a plurality of buffers, each buffer uniquely identifiable within the predefined address word and said virtual memory logic provides a unique pointer to each of said buffers.

12. The apparatus of claim 11, wherein each of said pointers includes fields for linking to the other pointers.

13. The apparatus of claim 11, wherein each of said plurality of buffers is of an equal size and that size is a multiple of a page size.

14. The apparatus of claim 11, further comprising a unique structure for each buffer that contains a measure field, a flag field and pointers to the unique structures of the other buffers.

15. The apparatus of claim 8, wherein said virtual memory logic includes library level logic configured to function at an interface of an operating system in said processor and an application for allocating the resident and non-resident memory to that application.

16. The apparatus of claim 11, further comprising:

means for designating buffers in the resident memory as Active and Inactive, the Inactive designation indicating that a resident buffer is not currently being accessed by a process running in said processor; and means for switching a requested buffer from the remaining memory with an Inactive buffer.

17. An apparatus for processing electronic data, comprising:

a processor having an address word of a predefined length;

a main memory having a size larger than the addressable range of said predefined address word; and means for dividing said main memory into a plurality of buffers, uniquely identifiable within the address range of said predefined address word.

* * * * *